March 27, 1962 W. G. ATHERTON 3,027,470
COOLING PASSAGE MEANS FOR DYNAMOELECTRIC MACHINES
Filed Nov. 5, 1958 2 Sheets-Sheet 1
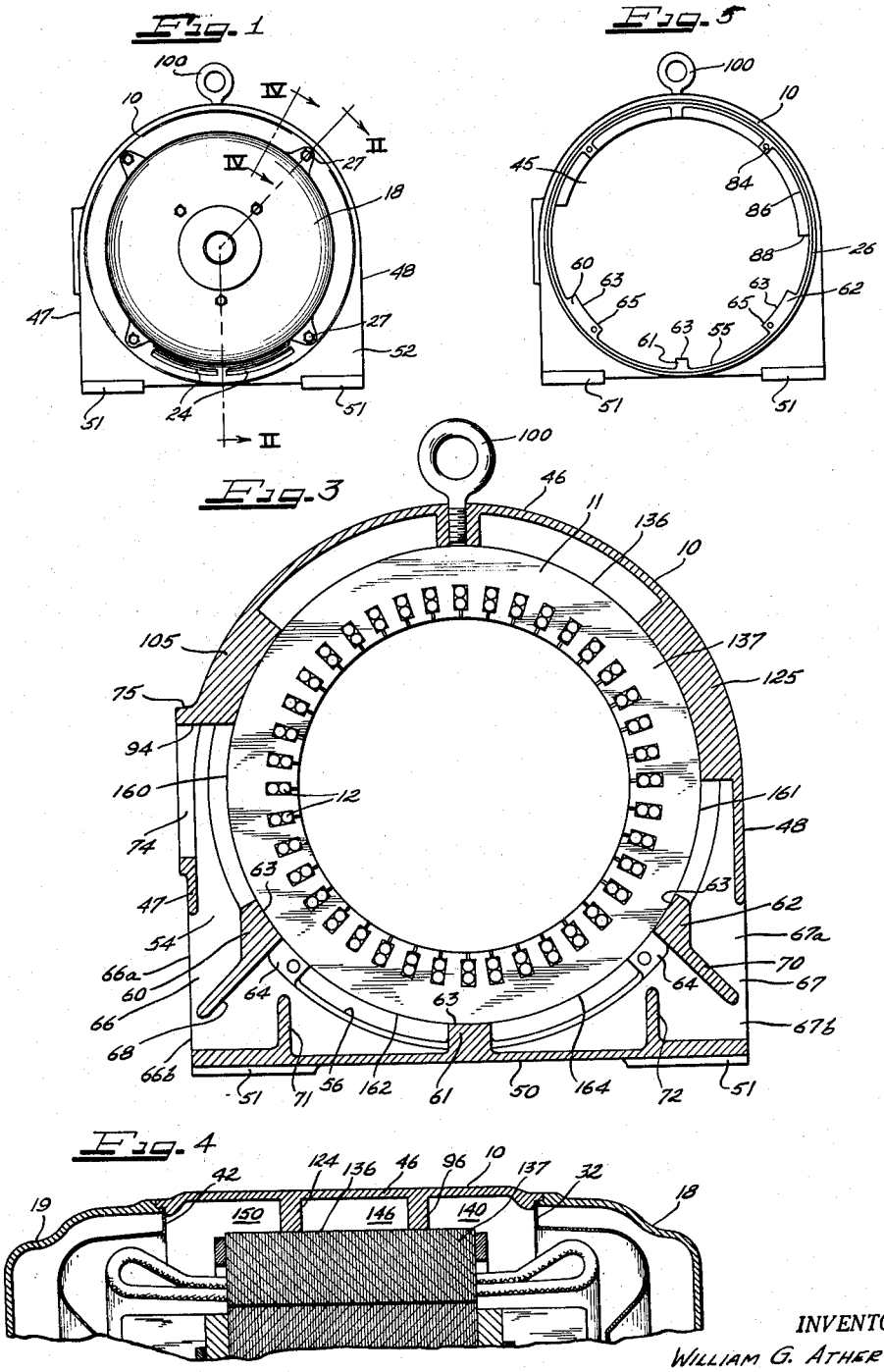
INVENTOR.
WILLIAM G. ATHERTON

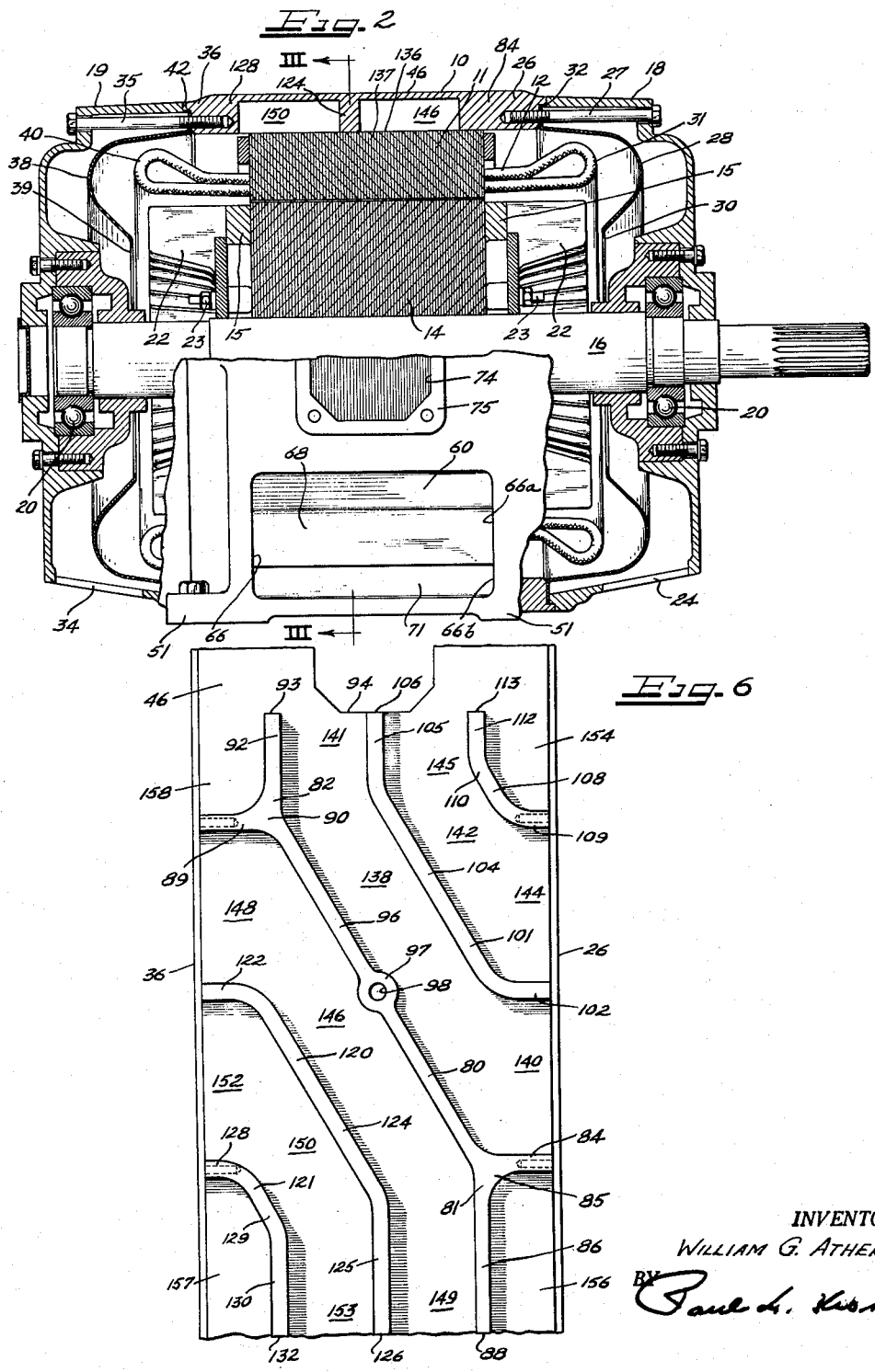

United States Patent Office 3,027,470
Patented Mar. 27, 1962

3,027,470
COOLING PASSAGE MEANS FOR DYNAMO-ELECTRIC MACHINES
William G. Atherton, Freeport, Ill., assignor to Fairbanks, Morse & Co., Chicago, Ill., a corporation of Illinois
Filed Nov. 5, 1958, Ser. No. 772,016
6 Claims. (Cl. 310—59)

This invention relates to dynamoelectric machines of substantially enclosed air-cooled type, and has reference more particularly to improvements in the ventilation and cooling of such machines.

As is well known in connection with machines of the character indicated, such for example as a so-called drip-proof and splash-proof induction motor having a frame or housing protectively enclosing the motor stator and rotor elements, the major heat concentration appears in the upper portion or region of the housing about the stator. While, admittedly, various provisions have been made employing forced air flow for cooling such machines, the provisions known to applicant and in general use heretofore, have not been entirely satisfactory. Those provisions which include air flow passageways in the affected region, have failed to provide the desired high degree of cooling effectiveness, due principally to the character of passageway formation and directioning heretofore employed. The result has been a failure of such passageways to attain and assure optimum cooling air sweep over and about the stator, particularly in the aforesaid region of greatest heat concentration.

Accordingly it is the principal purpose of the present invention to provide a substantially enclosed air-cooled electrical machine having forced air-flow cooling provided in an improved manner which assures heat removal from the region of major heat concentration, as the upper region of the machine housing about the stator, and which affords such cooling effectiveness as to permit power rating of the machine of given frame size, at a value appreciably above the maximum rating heretofore permissible in a like machine of the same frame size.

Another purpose or object of the invention is to provide an electrical machine of the character indicated, having forced air-flow cooling and embodying greatly improved air-flow passageways between the stator and stator housing, which are formed and directed to attain air-flow sweep peripherally over the top of the stator and downwardly over the opposite stator sides to discharge laterally of the housing near the base region thereof.

The foregoing and other objects and advantages of the present invention will appear from the following description of a preferred embodiment thereof, as such is illustrated in the accompanying drawings, wherein:

FIG. 1 is an end elevation of the machine at one end thereof.

FIG. 2 is an enlarged longitudinal section of the machine, with a portion of one side thereof in elevation, the view being from line 2—2 in FIG. 1.

FIG. 3 is a transverse section through the stator frame and stator of the machine (with the rotor omitted), as viewed along line 3—3 in FIG. 2.

FIG. 4 is an enlarged fragmentary section longitudinally of the machine, as taken along line 4—4 in FIG. 1.

FIG. 5 is an end elevational view of the stator frame member alone.

FIG. 6 is a planar developed view of the stator frame member in fragmentary part, as over the internal upper half thereof.

With reference now to the several views of the drawings, the presently improved air-cooling provision is embodied by way of example, in a conventional induction type motor unit of protectively enclosed form. Such unit includes as appears in FIG. 2, a stator frame or housing member 10 hereinafter to be more particularly described, an annular motor stator 11 therein and having stator windings 12, and a motor rotor member 15 having a closed or so-called squirrel-cage type rotor winding not shown except for the opposite winding end rings 15. Rotor 14 is mounted on motor shaft 16 and keyed or otherwise secured thereto, the shaft being rotatably carried by opposite frame end closures 18 and 19 through suitable bearings such as the anti-friction bearings 20. At each end of rotor 14 is a suitable air-flow inducing unit or fan 22 rotatable with the rotor, being secured to the latter as by bolting indicated at 23.

End closure 18, affording one or more air inlet openings 24 (two being shown in FIG. 1) at the lower side thereof, is removably mounted to the end 26 of stator frame member 10 by bolts 27. Disposed in the end closure is an annular, curved wall element or baffle 28 having a central opening 30 opposed to the air inlet portion of the adjacent fan 22 for the passage of air thereto from the inlet openings 24. The baffle extends in spaced, embracing relation to the end-turn portion 31 of the stator winding, and has a marginal flange 32 clamped between the end closure and stator frame end 26, for baffle mounting. Similarly, the opposite end closure 19 having air inlet openings 34 in its bottom side, is mounted by bolts 35 to the opposite end 36 of stator frame 10. Also, a like baffle 38 having central opening 39 opposed to the air inlet portion of the adjacent fan 22, extends in spaced embracing relation to the end-turn portion 40 of the stator winding, with its marginal flange 42 clamped between the end closure and stator frame end 36.

Turning now to the stator frame 10, this member presents a unitary structure, as a single casting having an internal cylindrical, stator receiving bore 45 (FIG. 2) open at the opposite frame ends 26 and 36. The frame provides an arcuate wall 46 over substantially the upper half thereof, and opposite substantially straight side walls 47 and 48 terminating in a mounting base, generally indicated at 50, having mounting flanges 51 in the corner regions thereof. In the lower half of the frame, the frame end portions 26 and 36 provide like transverse end wall portions, as the end wall portion 52 of frame 26 shown in FIGS. 1 and 5, and the end wall portion 54 at frame end 36 shown in FIG. 3. Such wall portions 52 and 54 each has an inner arcuate margin, as the respective margins 55 (FIG. 5) and 56 (FIG. 3). Extending longitudinally of the frame between the end wall portions are stator core support bars 60, 61 and 62 each having an arcuate core seat 63 exposed radially inwardly from the wall margins 59. Also, adjacent the bars 60 and 62 are closure mounting lugs 64 on end wall margin 56 (FIG. 3) and lugs 65 on end wall margin 55 (FIG. 5).

The side wall 47 provides a generally rectangular air outlet opening 66 (FIGS. 2 and 3) between the frame end wall portions and adjacently above the frame base 50, while the opposite side wall 48 has a similar air outlet opening 67. Moreover and as here preferred, the stator support bar 60 includes a wall-like flange extension 68 terminating in the region of opening 66 and extending longitudinally thereof, dividing the opening into upper and lower outlets 66a and 66b respectively. Likewise, the bar 62 has a similar wall-like flange extension 70 dividing opening 67 into the respective upper and lower outlets 67a and 67b. Also, baffle elements are provided in upstanding positions on the frame base 50, one such baffle 71 extending longitudinally between the frame end wall portions and inwardly from the flange 68, and the other baffle 72 being similarly related to flange 70. Centrally above opening 66a in frame side wall 47 is another opening 74 to accommodate stator winding leads therethrough (not shown), this opening normally being closed by a suitable conduit box (not shown), removably mounted on the frame boss 75 provided at such opening.

Completing the stator core support means in the frame are a plurality of ribs internally integral with the arcuate frame wall 46 over the upper half of the frame, and with the opposite frame ends 26 and 36 in such region. The form, relative spacing and angular directioning of these ribs best appear in FIG. 6 which is a developed view of the upper half of the stator frame as shown in FIG. 2. As there shown, there is a relatively long central rib member generally indicated at 80, having similar opposite ends 81 and 82. The end 81 provides a length 84 extending inwardly in the axial direction from the open end 26 of the frame, to a juncture zone 85. Such rib end portion 84 is substantially radial, depthwise, of the frame and located at approximately 45 degrees to the horizontal axial plane of the frame, as such appears in FIG. 5. Rib end 81 also provides a length 86 extending from the juncture zone 85 arcuately in the circumferential direction of the frame wall 46 toward side wall 48 and terminating at 88 which is substantially in the horizontal axial plane of the frame. This rib end portion also is radial. The opposite rib end 82 provides a like end portion 89 directed axially from the frame 36 to junction zone 90 and located at approximately 45 degrees to the horizontal axial plane of the frame, and a similar end portion 92 extending from juncture 90 arcuately in the circumferential direction of the frame wall 46 toward opposite side wall 47. Rib end 92 here by preference, terminates at 93 short of the horizontal axial plane of the frame, as substantially in axial alignment with the top margin 94 of the side wall opening 74. Extending arcuately and diagonally of frame wall 46 to and between the juncture zones 85 and 90 is the major length 96 of the rib 80. Such rib length 96 thus extends axially from one side to the other of the frame wall 46 over the top thereof, and is provided with an enlargement or boss 97 at its lengthwise center which is coincident with the top center of wall 46. The purpose of boss 97 is to afford a threaded opening 98 to receive the usual frame handling eyebolt 100 as shown in FIGS. 1, 3 and 5.

Referring further to FIG. 6 in particular, spaced from and extending generally parallel to the portions 84, 96 and 92 of central rib 80, is a rib 101 of shorter length. This rib provides an end portion 102 extending axially to the frame end 26 along the top longitudinal center line of the frame wall 46, an intermediate arcuate length 104 in the diagonal direction relative to the frame wall 46, and an opposite end portion 105 of arcuate extent in the circumferential direction toward frame side wall 47. End portion 105 is substantially centered axially between the opposite frame ends 26 and 36, and has its terminal end 106 in register with top margin 94 of side wall opening 74. A still shorter rib 108 spaced from and generally parallel with rib 101, is provided in the lower lateral region of frame wall 46 at the side thereof adjacent frame side wall 47. Like rib 101, the rib 108 has an axial end 109 terminating at the frame end 26, intermediate diagonally arcuate portion 110, and opposite arcuate end portion 112 directed circumferentially of the frame wall to terminal end 113 in axial register wtih rib end 106. Axial end 109 is here located at approximately 45 degrees to the horizontal axial plane of the frame.

On the opposite side of central rib 80 are relatively spaced ribs 120, and 121 respectively similar to ribs 101 and 108, these being correspondingly related on the portion of frame wall 46 at the side toward frame side wall 48. Thus, rib 120 provides an end portion 122 extending axially toward and to frame end 36, intermediate portion 124 of diagonally arcuate extent, and opposite end portion 125 arcuate in the circumferential direction and terminating in end 126 substantially in the longitudinal axial plane of the frame. The axial end portion 122 of rib 120 as in the case of end 102 of rib 101, lies along the top longitudinal center line of frame wall 46. Rib 121 has an axial end portion 128 terminating at frame end 36, intermediate portion 129 of diagonally arcuate extent, and opposite end portion 130 arcuate in the circumferential direction and terminating in end 132 substantially in the horizontal axial plane of the frame. End 128 of this rib is disposed at approximately 45 degrees to such horizontal plane of the frame.

As is apparent in the several views, particularly the view of FIG. 5, the forward (radially inner) faces or edge surfaces of the ribs 80, 101, 108, 120 and 121 all lie in a common cylindrical plane concentric of the longitudinal frame axis, which plane contains, also, the arcuate inner faces 63 of the bars 60, 61 and 62, these rib and bar faces thus defining the stator receiving bore 45 of the frame. Upon end-wise insertion of the stator assembly 11 therein, the outer peripheral surface 136 of the annular stator core 137 engages the bar and rib faces in firm seating thereon. The stator core as longitudinally centered in the frame and suitably secured therein, thereby has its periphery 136 cooperating with the ribs and frame wall 46 to form laterally closed, endwise open air flow passages each of major diagonal trend over the upper half of the core. More particularly and as indicated in FIG. 6, these passages comprise diagonal passage 138 between ribs 80 and 101 having axial inlet portion 140 and circumferentially directed outlet portion 141; diagonal passage 142 between ribs 101 and 108 having axial inlet portion 144 and circumferentially directed outlet portion 145; diagonal passage 146 between ribs 80 and 120 having axial inlet portion 148 and circumferentially directed outlet portion 149, and diagonal passage 150 between ribs 120 and 121 having axial inlet portion 152 and circumferentially directed outlet portion 153.

With the motor assembled and in operation, the cooling air flow therein is as follows, described first in respect to the upper half of the motor: Air entering the inlet ports 124 of end closure 18 is directed by baffle 28 to the intake of the adjacent fan 22, the fan then establishing force flow of air therefrom over and about the field end turns 31 beneath the baffle 28 and to the frame passage inlets 140 and 144. Air under such force flow, passes generally axially in the noted passage inlets, and thence diagonally over the stator core through diagonal passages 138 and 142, and then downwardly in the circumferential direction in the respective passage outlet portions 141 and 145. The air issuing from the latter, then passes downwardly between the stator core periphery and the frame side wall 47 to flange 68 and laterally outward of the motor through discharge opening 66a. Some air will, of course, enter the marginal space 154 (FIG. 6) and pass downwardly therein to ultimate discharge through outlet 66a, and similarly in respect to the space 156 at the opposite frame side, where such air will discharge through opposite outlet 67a. Air entering at inlet ports 34 in the opposite end closure 19 and directed by baffle to the inlet of the adjacent fan 22, is forced by the fan to flow over and about the field end turns 40 beneath the baffle, and axially to the frame passage inlets 148 and 152. The forced air flow then passes diagonally over the stator core through diagonal passages 146 and 150 (in a direction opposite to the flow direction in passages 138 and 142), and thence downwardly in the circumferential direction in the respective passage outlet portions 149 and 153. Air issuing from the latter then passes downwardly between the stator core periphery and the frame side wall 48 to flange 70 and laterally outwardly of the motor through discharge opening 67a. As in the case at the other end of the frame, some air will enter the marginal space 157 (FIG. 6) and flow downwardly therein to ultimate discharge at outlet 67a, while air will enter marginal space 158 at the opposite frame side for flow downwardly therein to discharge through outlet 66a.

In respect to fan produced air flow in the lower half of the stator frame assembly, the baffle 28 and 38 direct air flow axially thereto, with the flow divided by the bars 60, 61 and 62 such that air passes in cooling relation to the peripheral portions 160 and 161 of the stator core and thence to discharge through outlets 66a and 67a; passes in cooling relation to core peripheral portion 162 and thence to discharge over baffle 71 and out the discharge outlet 66b, and passes in cooling relation to core peripheral portion 164 and thence to discharge over baffle 72 and through outlet 67b. The stator frame bottom wall 50 and the baffles 71 and 72 cooperate to assure cooling flow over the core portions indicated, before discharge at outlets 66b—67b.

Thus, the construction as now described provides for fan developed forced air flow aixally to the opposite ends of the stator assembly and over substantially the entire periphery of the stator core to lateral discharge at the opposite sides of the stator frame adjacent the base region thereof. Importantly to the present invention and as the major feature thereof, the character of air flow in the upper half of the stator assembly, as attained by the rib-formed passage arrangement particularly illustrated in FIG. 6, is such as to markedly improve motor cooling in such region. Considering the views of FIGS. 2, 3 and 6, it will be apparent that cooling air delivered axially to the inlets 140 and 144 at the right end of the frame (FIG. 2), sweeps diagonally over top portions of the stator core through diagonal passages 138 and 142, and thence downwardly in the circumferential direction at one side over the core periphery, as through passage ends 141 and 145 and between the core and frame side wall 48, to discharge laterally of the frame through outlet 67a. In like manner, cooling air delivered axially to the inlets 148 and 152 at the left end of the motor, sweeps diagonally over the remaining top portions of the stator core through diagonal passages 146 and 150, and thence downwardly in the circumferential direction at the opposite frame side over the core periphery, as through passage ends 149 and 153 and between the core and frame side wall 47, to discharge laterally of the frame through outlet 66a. Accordingly, the arrangement provides diagonal and circumferential air flow in opposite directions on opposite sides of the center rib 80, through relatively long flow paths as indicated. In such arrangement, relatively cool air enters the uppermost regions of the stator assembly, being the regions of greatest heat concentration in a substantially enclosed machine as illustrated, and passes in effective heat absorbing sweeping contact with the ribs and stator core periphery, to discharge of the heated air laterally from both sides of the machine near the base zone thereof. The result is a more effective motor cooling with positive removal of heat from the top regions of maximum heat concentration, such as to permit power rating of the machine at a value appreciably greater than the now permissible power rating of a machine of like frame size but having a cooling air flow system of conventional or heretofore known character.

Having now illustrated and described a presently preferred embodiment of the invention, it is to be understood that the same may be modified without departing from the spirit and scope of the invention as hereinafter claimed.

What is claimed is:

1. In a dynamoelectric machine, an annular stator core, a stator core housing having a base portion, said housing being adapted for cooperation with the stator core in support therein, to form distinct air flow passages of angulate trend localized over the stator core peripheral portion in the upper portion of the housing, providing for direct air flow contact with said stator core peripheral portion, certain of said passages being in parallel adjacence and each having an air entrance end generally axially of the housing adjacent one end of the stator core and an outlet end portion extending in the circumferential direction of the stator core toward one side of the latter, others of the passages being in parallel adjacence and each having an air entrance end generally axially of the housing adjacent the opposite end of the stator core and an outlet end portion extending in the circumferential direction of the stator core toward the opposite side of the latter, said housing having an air discharge opening in one side thereof and communicating with the outlet end portions of said certain passages, and an air discharge opening in the opposite side thereof and communicating with the outlet end portions of said others of the passages, and means for causing and directing air flow to the air entrance ends of said passages.

2. In a dynamoelectric machine, an annular stator core, a stator core housing having a base portion, means internally of the housing including relatively spaced ribs of angulate trend localized in the upper portion of the housing, mounting said stator core in the housing with its peripheral surface spaced inwardly from the internal surface of the housing, said ribs and housing forming with the adjacent peripheral surface portion of the stator core, distinct air flow passages localized in said upper portion of the housing, certain of said passages being in parallel adjacence and having air entrance ends generally axially of the housing adjacent one end of the stator core and outlet end portions extending in the circumferential direction of the stator core toward one side thereof, others of said passages being in parallel adjacence and having air entrance ends generally axially of the housing adjacent the opposite end of the stator core and outlet end portions extending in the circumferential direction of the stator core toward the opposite side thereof, said housing having an air discharge opening at one side and communicating with the outlet end portions of said certain air passages, the housing providing an opposite side discharge opening communicating with the outlet end portions of said others of the passages, closure members at the housing ends and each having an air inlet opening, air flow directing means in one of said closure members providing for air flow from the inlet opening of such closure member to the air entrance ends of said certain passages, and air flow directing means in the other closure member providing for air flow from the inlet opening of the latter to the air entrance ends of said others of the passages.

3. In a dynamoelectric machine, an annular stator core, a cylindrical stator core housing having a base portion, means internally on the housing including relatively spaced ribs localized in the upper portion of the housing, mounting the stator core therein with its upper peripheral surface portion spaced by the ribs inwardly from the overlying internal cylindrical surface portion of the housing, said ribs being arranged in the housing and cooperating with said cylindrical surface portion of the housing and said upper peripheral surface portion of the stator core, to form separate air flow passages providing a first passage extending from one end of the stator core generally diagonally over the top of said upper peripheral surface portion of the stator core and thence in the circumferential direction along one side of the stator core, a second passage extending from the opposite stator core end generally diagonally over the top of said upper peripheral surface portion of the stator core and thence in the circumferential direction along the opposite side of the stator core, and at least one passage at each side of the stator core generally paralleling the adjacent one of said first and second passages, the stator core housing having air discharge openings at opposite sides thereof adjacent the housing base portion, closure members for the housing ends, a shaft extending axially through the stator core and rotatably carried by said closure members, a rotor on the shaft and cooperating with the stator core, said closure members providing air inlet openings, and air moving means operated by said rotor for causing air flow from said air inlet openings to said air discharge openings through said passages.

4. A housing for an annular stator core of an electrical machine, comprising a cylindrical member open at its ends and providing a pair of mounting projections integral with the lower half of the member at each side thereof, the projections of each pair being spaced apart axially of the member, said member having integral stator core seat means internally of its lower half and providing a side opening between each pair of projections, and integral stator core seat means in the upper half of the cylindrical member, comprised of a plurality of ribs; one rib thereof providing an arcuate intermediate length extending diagonally from one side to the other in said upper half of the member, and having its center substantially coincident with the axial center of the member at the top of its upper half, one end portion of said one rib providing an end element extending axially of the member toward one open end of the latter and an arcuate end element extending in the circumferential direction at one side of the member in its upper half, the opposite end portion of said one rib providing an end element extending axially of the member toward the opposite open end of the latter and an arcuate end element extending in the circumferential direction at the opposite side of the member in its upper half; a second rib thereof spaced from said one rib, having an end portion extending axially toward one open end of the member, an arcuate intermediate length extending diagonally of the member at one side of the latter in its upper half, and an opposite arcuate end portion extending in the circumferential direction of the member at said one side thereof; and a third rib thereof spaced from said one rib, having an end portion extending axially toward the opposite open end of the member, an arcuate intermediate length extending diagonally of the member at the opposite side of the latter in its upper half, and an opposite arcuate end portion extending in the circumferential direction of the member at said opposite side thereof.

5. A housing as defined by claim 4, characterized further by an additional rib spaced from and generally paralleling each of the said second and third ribs, in the said upper half of said cylindrical member.

6. In a dynamoelectric machine, a stator frame open at its ends and having a base portion, a substantially semi-circular upper wall and opposite side walls joining the upper wall and base portion, a stator assembly including an annular stator core, mounting means integral with the frame internally thereof for mounting the stator assembly in the frame, closure members at the frame ends and each having an air inlet, a shaft rotatably supported by said closure members, a rotor member on said shaft for cooperation with the stator assembly, said mounting means including relatively spaced ribs in said upper wall of the frame cooperating with the stator core to define a plurality of air passages each having the intermediate length thereof in diagonally arcuate extension over the upper peripheral portion of the stator core, certain of the air passages being in parallel adjacence and having inlet ends directed axially at one end of the frame and outlet ends directed circumferentially of the core at one side of the frame upper wall, others of the air passages being in parallel adjacence and having inlet ends directed axially at the other end of the frame and outlet ends directed circumferentially of the core at the opposite side of the frame upper wall, each frame side wall having a discharge opening adjacent the frame base portion, means including one frame side wall and the adjacent peripheral portion of the stator core forming a communicating passage between the outlet ends of said certain air passages and the discharge opening of said one side wall, means including the other frame side wall and the adjacent peripheral portion of the stator core forming a communicating passage between the outlet ends of said others of said passages and the discharge opening of said other side wall, and means including fans at the opposite ends of said rotor member and rotatable therewith, for establishing forced air flow from the air inlets of the closure members to the inlet ends of said air passages, through the air passages and the outlet ends thereof, and through the communicating passages to and outwardly through said discharge openings.

References Cited in the file of this patent

UNITED STATES PATENTS

| | | |
|---|---|---|
| 1,601,531 | Jeannin | Sept. 28, 1926 |
| 1,961,387 | Pfleger | June 5, 1934 |
| 2,347,517 | Smalley | Apr. 25, 1944 |
| 2,454,180 | Johns | Nov. 16, 1948 |
| 2,620,449 | March | Dec. 2, 1952 |
| 2,782,327 | Worth | Feb. 19, 1957 |

FOREIGN PATENTS

| | | |
|---|---|---|
| 819,282 | Germany | Oct. 31, 1951 |